United States Patent [19]

Imanaka et al.

[11] Patent Number: 4,773,447
[45] Date of Patent: Sep. 27, 1988

[54] ELECTROMAGNETIC VALVE

[75] Inventors: Asaji Imanaka, Kobe; Mitsuhiro Ikeda, Amagasaki, both of Japan

[73] Assignee: Nippon Air Brake Co., Ltd., Kobe, Japan

[21] Appl. No.: 66,900

[22] Filed: Jun. 25, 1987

[30] Foreign Application Priority Data

Jun. 25, 1986 [JP] Japan .............................. 61-97173[U]

[51] Int. Cl.4 ............................................. F16K 11/10
[52] U.S. Cl. ................................................. 137/627.5
[58] Field of Search ..................................... 137/627.5

[56] References Cited

U.S. PATENT DOCUMENTS 3,332,445 7/1967 Allen ................................. 137/627.5
3,525,555 8/1970 Meyer .......................... 137/627.5 X
4,499,921 2/1985 Stoll ................................. 137/627.5

Primary Examiner—Robert G. Nilson
Attorney, Agent, or Firm—J. O. Ray, Jr.

[57] ABSTRACT

The present invention discloses an electromagnetic valve for use in a railroad car slip prevention control of the brake system. Such electromagnetic valve having three-position control capability. The control position is selected based on an excitation current supplied to a solenoid valve.

6 Claims, 3 Drawing Sheets

ELECTROMAGNETIC VALVE

FIELD OF THE INVENTION

The present invention relates, in general, to an air brake system on a railroad car and, more particularly, this invention relates to an electromagnetic valve for use in a wheel slip prevention system of such railroad car air brake system.

BACKGROUND OF THE INVENTION

Railroad car slip prevention systems are well known in the prior art. See, for example, Japanese Utility Model Nos. 53-6170 and 59-34543; Japanese Patent No. 51-17662, and, one illustrated in FIG. 9 on page 329 of "The Articles of the Fourteenth Domestic Symposium on Cybernetics Utilization in Railways." These prior art wheel slip prevention systems are explained hereinafter with reference to FIGS. 4 and 5. In these Figures, MV1 is a first electromagnetic valve used for braking; MV2 is a second electromagnetic valve used for brake release, and KK is the wheel slip detecting system. The wheel slip prevention system inputs the axle speed of each axle and calculates the difference between each axle speed or the acceleration and deceleration and detects the slip or the recovery and controls ON and OFF of both of the electromagnetic valves MV1 and MV2.

As illustrated, CV designates the control valve which controls communication of fluid pressure, such as compressed air, according to the brake command. In addition, RV1 and RV2 designate the relay valves which amplify the flow rate of the compressed air being communicated from the above-referenced control valve CV. In the drawing FIGS. 4 and 5, "BC" is the brake cylinder and the compressed air source is designated "MR". Even though, as illustrated here, the structure of the relay valves RV1 and RV2 are a little different, they are well known and, consequently, a detailed description of such relay valves is omitted for the sake of brevity. In both FIG. 4 and FIG. 5, the brake status is illustrated in which the control valve CV communicates a predetermined amount of compressed air in accordance with a specific brake command and both electromagnetic valve MV1 and MV2 are OFF. In this case, the relay valves RV1 and RV2 supply and maintain the communication of such compressed air corresponding to the predetermined amount in the brake cylinder BC.

In the braking situation described above, when wheel slip is detected, the electromagnetic valves MV1 and MV2 are switched to ON and the compressed air in the brake cylinder BC is exhausted from the relay valves RV1 and RV2. In this manner, the brake is allowed to move to a release position. Once recovery of the axle speed is detected, which is after the wheel slip has been stopped by the brake release, the system returns to the status illustrated in FIGS. 4 and 5.

An overlapped condition can be easily maintained in the illustrated prior art railroad car braking system when the electromagnetic valve MV1 is "ON" and the electromagnetic valve MV2 is "OFF." Thus, the two electromagnetic valves MV1 and MV2 can be utilized for three conditions. Namely, these conditions are brake release, overlapping and braking, and control, i.e., readhesion control.

Nevertheless, the examples of the prior art described above with respect to FIGS. 4 and 5 have certain disadvantages associated with their use. These disadvantages are cost, size, and installation requirements, since they require two electromagnetic valves MV1 and MV2. These electromagnetic valves MV1 and MV2 are two-part, two-position valves which have an "ON-OFF" type control system. Therefore, the use of a three-point, three-position electromagnetic valve could be considered for use in this application, however, if such electromagnetic valve is an ordinary double solenoid type valve, then the electric power consumption will be almost the same as for the two electromagnetic valves MV1 and MV2. Thus power saving would be negligible.

Further prior art of interest may be found in Japanese Patent Nos. 59-4583, 60-39913, and 61-59080. Each of these patents teaches an electromagnetic valve which, although it is not used on a railroad car brake system, but instead is used in a hydraulically-controlled anti-skid system of an automobile, includes a three-part system capable of being switched into three different positions by controlling the excitation current of a single solenoid. For this reason, the use of a system incorporating these particular valves into a railroad car brake system could conceivably be considered as an alternative method of achieving the object of the present invention. However, each of these electromagnetic valves for use in an automotive application has a rather complicated construction. For example, the fixed valve seats are placed on both ends of the axial direction inside the solenoid. Furthermore, the movable valve member is installed in the movable inner core so that it can move freely by way of a guide member. These movable valve members are installed on both sides corresponding to the above-referenced pair of fixed valve seats. It should also be noted that these two movable valve members are moved by way of a spring which is positioned between them and that in the installed position of such movable valve members a predetermined clearance is of critical importance between them and the guide member. As is recognized, the structure of the internal switching valves is relatively complex.

Additionally, these three referenced electromagnetic valves are used for the pressure control of a hydraulic system and their flow is very small so that the diameter of the inlet valve seat or the outlet valve seat is small and pressure equalization in these areas is not considered. Therefore, they cannot be used as is for a railroad car which uses a pneumatic control system and has a large flow.

SUMMARY OF THE INVENTION

The present invention teaches an electromagnetic valve, wherein the inside of the main body is characterized by a first chamber which connects to a first port. An equalization chamber which has a larger diameter than the first chamber. A second chamber which connects to a second port and which has a larger diameter than the equalization chamber, and a third chamber which connects to a third port and the above-mentioned equalization chamber are connected, in order, to form a concentric ring structure. A fixed valve seat which has almost the same effective cross-section area as the opening cross-section area of the above-mentioned equalization chamber, and protrudes into the second chamber side between the second chamber and the third chamber. A step-shaped end part of the movable valve is inserted into the first chamber and the equalization chamber such that it can slide freely and in an airtight manner. This movable valve is hollow inside and has an internal connecting passage which opens to the tip end surface which is the second chamber side and to the back end surface which is the first chamber side. A second spring which adds a force in the direction in which the tip end surface of this movable valve sits on the above-mentioned fixed valve seat, and the tip end of the movable valve seat, the rear end of which is fixed to the movable iron core which causes a suction force in response to the excitation current of the solenoid, is fitted inside the above-mentioned fixed valve seat so that it faces the tip end of the movable valve. This movable valve seat is hollow inside and has an internal equalization passage which opens to the tip end surface and the rear end surface and connects to the surrounding chamber of the above-mentioned iron core. The effective cross-section area of the tip end of this movable valve seat is larger than the tip end opening area of the above-mentioned movable valve, and also is almost the same as the opening cross-section area of the above-mentioned first chamber. A first spring which exerts its force in the direction to resist the above-mentioned suction force. The first set point is chosen from any value of the excitation current when the above-mentioned suction force is less than the added force of the first spring, and the second set point is determined from any value of the excitation current when the above-mentioned suction force is larger than the added force of the first spring and also is smaller than the total combined force of the first spring and the second spring, and the third set point is determined from any value of the excitation current when the above-mentioned suction force is larger than the above-mentioned total added force of the springs.

OBJECTS OF THE INVENTION

It is, therefore, one of the primary objects of the present invention to provide an electromagnetic valve having the ability to select from three modes of operation, i.e., release, overlap and brake.

Another object of the present invention is to provide an electromagnetic valve which requires only a common position control for one fixed valve seat, one movable valve, and one movable valve seat.

Still another object of the present invention is to provide an electromagnetic valve in which pressure equalization in the switching valve can always be obtained under stable conditions so that control accuracy in a railroad car slip prevention system can be improved.

The above and various other objects and advantages of the present invention for an electromagnetic valve will become more readily apparent to those person skilled in the art from the following more detailed description when such description is taken in conjunction with the attached drawings and the appended claims.

BRIEF DESCRIPTION OF THE INVENTION

Figure 1:
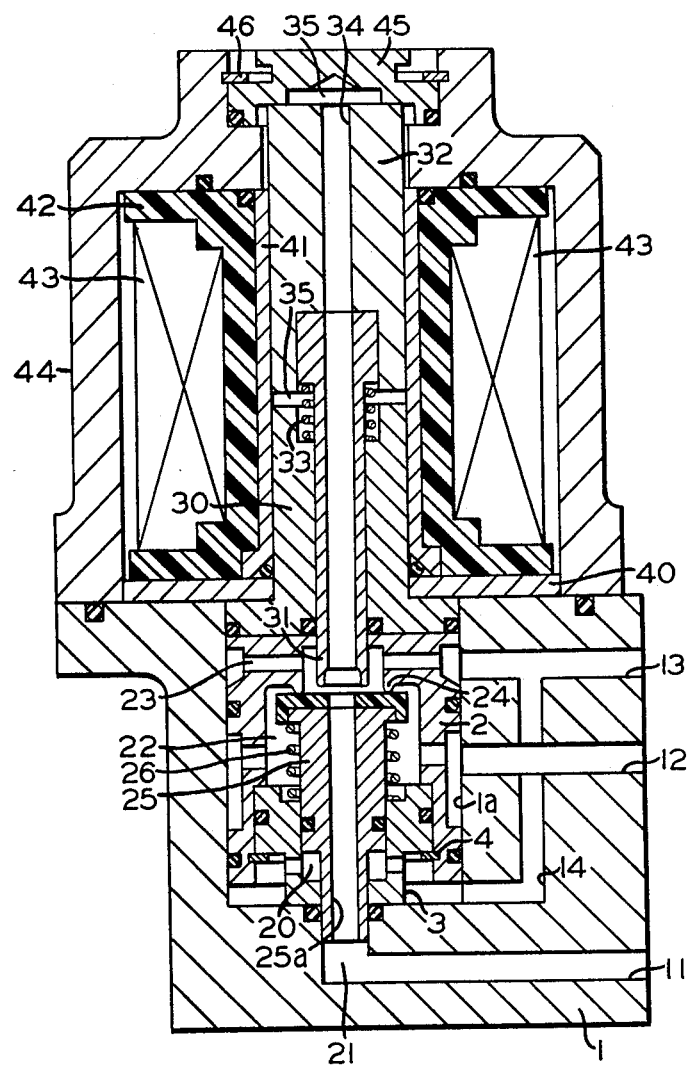
FIG. 1 is a cross-sectional view which shows one presently preferred embodiment of an electromagnetic valve constructed according to the present invention.
Figure 2:
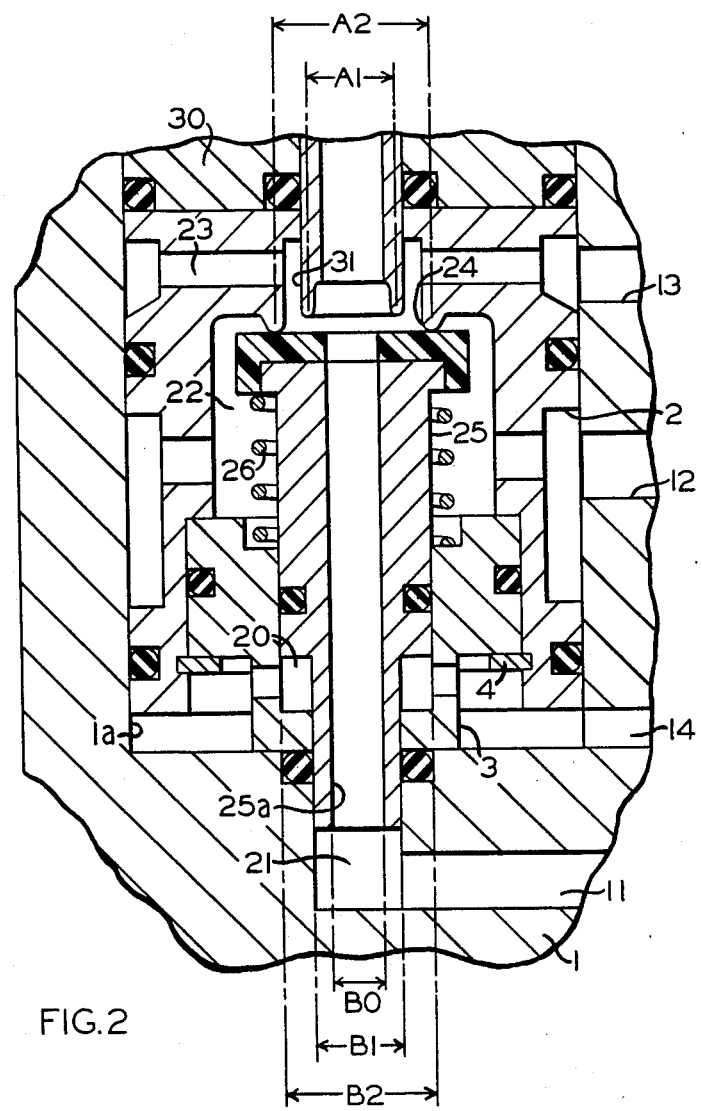
FIG. 2 is an enlarged fragmentary view in cross-section of the electromagnetic valve illustrated in FIG. 1.
Figure 3:
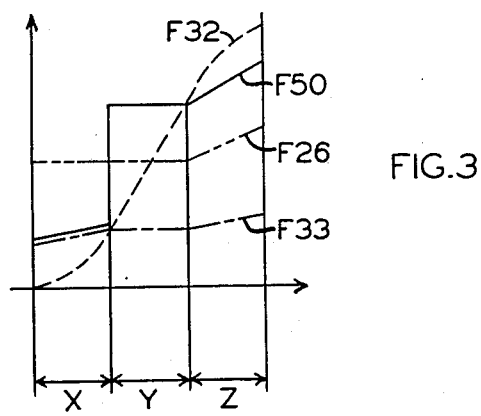
FIG. 3 is a schematic diagram in graph form showing the relationship between the suction force and the added force of the spring with respect to the excitation current of the electromagnetic valve illustrated in FIGS. 1 and 2.

When referring more particularly to the drawings, it should be noted that identical numbers have been used to describe identical parts. One presently preferred embodiment of the invention is illustrated in FIGS. 1 through 3. Now refer to the cross-sectional view of the entire electromagnetic valve illustrated in FIG. 1, the enlarged fragmented cross-section view of FIG. 2 and the schematic diagram which illustrates a plot of the suction force and the spring force added thereto against the solenoid excitation current. As illustrated, the electromagnetic valve includes a main body portion 1 having an inner cavity 1a which, in FIG. 1, is shown opening upward. Positioned within the inner cavity 1a is an assembly which includes a first intermediate member 2 and a second intermediate member 3. After insertion into the inner cavity 1a such first intermediate member 2 and second intermediate member 3 are fixed. The second intermediate member 3 is fitted into the internally stepped portion of the first intermediate member 2 and is held in place by the retaining ring 4. It can be seen that the first and second intermediate members 2 and 3, respectively, form a portion of the main body portion 1 of the electromagnetic valve.

The main body portion 1 includes a first fluid communication port 11, a second fluid communication port 12 and a third fluid communication port 13. It can be seen that an inner cavity of the second intermediate member 3 also has a stepped structure which, in combination with the movable valve 25, forms a large diameter equalizaton chamber 20. There is a first chamber 21, having a smaller diameter than the equalization chamber 20 which is connected to the first port 11. The upper chamber positioned above the first intermediate member 2 forms the third chamber 23 and the chamber positioned adjacent the first and the second intermediate members 2 and 3, respectively, favors the second chamber 22 and such second chamber 22 connects to the third port 13 and at the same time connects to the equalization chamber 20 via the return passageway 14. Each of the first chamber 21, the equalization chamber 20, the second chamber 22 and the third chamber 23 continue in order of size in the vertical direction and preferably form concentric circles. A portion of the first intermediate member 2 forms the fixed valve seat 24 which, as shown, protrudes into the second chamber 22 side. Such fixed valve seat 24 is positioned between the second chamber 22 and the third chamber 23. The presently preferred effective cross-sectional area A2 of the fixed valve seat 24 should be approximately the same as the opening cross-sectional area B2 of the equalization chamber 20, as best seen in FIG. 2.

Additionally, the terminal, stepped, portion of the movable valve 25 is inserted into the inner cavity, with a step, of the second intermediate member 3, namely, the equalization chamber 20 and the first chamber 21 so that such movable valve 25 can slide freely and in a substantially airtight manner. The movable valve 25 is hollow along a longitudinal axis thereof and has a connecting passage 25a in the axial direction. It can be observed that one end of the connecting passage 25a opens to the tip end surface which is the side of the second chamber 22 and the other end opens to the rear end surface which is the first chamber 21 side. As illustrated in FIG. 1, the movable valve 25 is urged upwardly by the second spring 26. In other words, the applied force of the second spring 26 is added in the direction in which the tip end surface of the movable valve 25 seats against the fixed valve seat 24. The second spring 26 is positioned between the second intermediate member 3 and the movable valve 25 and, in addition, a predetermined prestress is applied to such second spring 26.

Above the first intermediate member 2, as illustrated in FIG. 1, the hollow-center fixed inner-core 30 is inserted and fixed in position. A movable valve seat 31 is inserted through the hollow-center of the fixed inner core 30 so that it can slide freely and in a substantially airtight manner. The tip end of the movable valve seat 31 (the lower end as seen in FIG. 1) passes the inner side of the fixed valve seat 24 and faces the tip end surface of the movable valve 25. As best seen in FIG. 2, the effective cross-section A1 of the tip end of the movable valve seat 31 is larger than the tip end opening area B0 of the movable valve 25 and is almost the same size as the opening cross section B1 of the first chamber 21. The opposite or near end of the movable valve seat 31 (i.e., the upper end as shown in FIG. 1) is positioned and fixed into the movable iron core 32, and the first spring 33 is caged between the movable valve seat 31 and the fixed iron core 30 such that the force of the first spring 33 is forced in a direction to resist the suction force of the movable iron core 32. In other words, the first spring 33 pushed the movable valve seat 31 upward in the Figure.

An equalization passage 34 is formed in the axial direction of the center portion of the movable valve seat 31 and the movable iron core 32. A first end of such equalization passage 34 opens to the tip end of the movable valve seat 31 and the opposed second end of such equalization passage 34 opens to the rear end of the movable iron core 36 and connects to a surrounding chamber 35. FIG. 1 illustrates the position of the movable iron core 32 when it is in a stored condition.

Further illustrated in FIG. 1 is a restraining member 40, a guide cylinder 41, a bobbin 42, a solenoid 43, a cover 44, a stopper 45 and a retaining ring 46. In FIGS. 1 and 2 it should be noted that, for the sake of clarity, identification numbers have been omitted for each of the seal members between the structural components. The elements as illustrated in FIGS. 1 and 2 are in a first position which occurs when the solenoid 43 is degaussed. It is at this time that the movable valve seat 31 separates from the movable valve 25 in response to the forces applied by the first spring 33 and the movable valve 25 is seated on the fixed valve seat 24 by the added force of the second spring 26. As can be seen in this first position, the first port 11 and the third port 13 are connected while the second port 12 is blocked.

Now refer more particularly to FIG. 3 where it can be seen that, when the excitation current of the solenoid 43 becomes gradually larger, the suction force generated in the movable iron core becomes larger, however, the suction force F32 is less than the added force F33 of the first spring 33 in the first range X of the excitation current so that the tip end of the movable valve seat 31 cannot seat onto the movable valve 25 and the first position is maintained.

When the excitation current increases and the suction force F32 reaches a point where it equals the force F33 added by the spring, then the tip end of the movable valve seat 31 seats on the tip end surface of the movable valve 25. At this time, the first port 11 and the third port 13 are blocked and the electromagnetic valve of the present invention assumes the overlap position in which each of the three ports 11, 12 and 13 are blocked. From this point, the added force F26 of the second spring 26 begins to work to resist the suction force F32 so that the total added force F50 of both springs 33 and 26 increases rapidly, so that even if the excitation current becomes a little larger, the above-mentioned overlap position can be maintained. This is indicated by the overlap range Y in FIG. 3. As the excitation current increases further, and the added suction force F32 becomes great enough to overcome the above-mentioned total force F50, which is the condition of the second range, the movable valve 25 on which the movable valve seat 31 is still seated begins to separate from the fixed valve seat 24 and the first port 11 becomes blocked while the second port 12 and the third port 13 are connected. This condition is the second position of the electromagnetic valve of the present invention. In this manner, by determining any value in each domain X, Y or Z as the first, second and third set point, and by selecting one of these three set points during the control, the position can be switched to the first, overlap and the second position.

Figure 4:
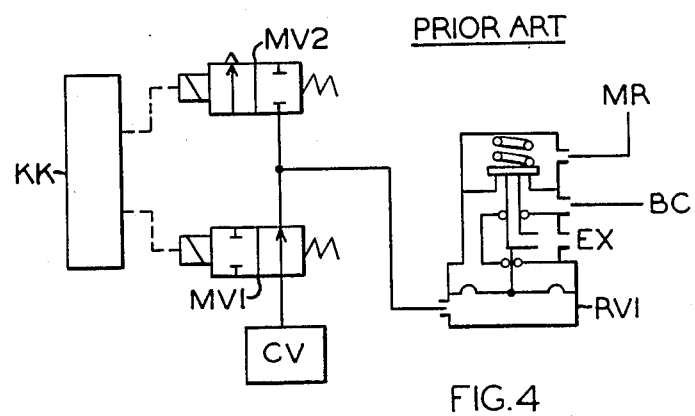
FIG. 4 is a schematic diagram of a prior art slip detection system for a railroad car wheel.
Figure 5:
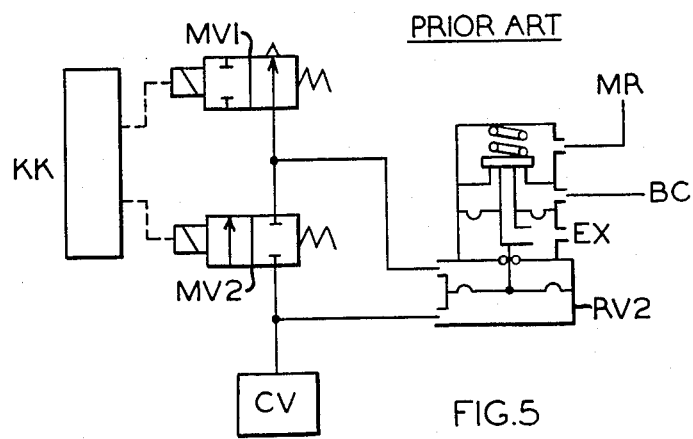
FIG. 5 is a schematic diagram of a second prior art slip detection system for a railroad car wheel.

When the electromagnetic valve, of the present invention, as described above, is used in an actual railroad car slip prevention system, the following two types of couplings are possible. First, when the relay valve RV1, as shown in FIG. 4, is used, the first port 11 of the electromagnetic valve of FIG. 1 is coupled to the control valve CV to make it the air supply port and the third port 13 is coupled to the diaphragm plate chamber of the relay valve RV1 to make it the air sending port and the second port 12 becomes the air exhaust port. Secondly, when the relay valve RV2 of FIG. 5 is used, the third port 13 of the electromagnetic valve of FIG. 1 is coupled to the upper diaphragm plate chamber of the relay valve RV2 and the first port 11 becomes the exhaust port while the second port 12 is coupled to the control valve CV and becomes the air supply port.

Additionally, in the electromagnetic valve of the present invention the surrounding chamber 35, a portion of which is adjacent the top of the movable iron core 32 and a portion of which is adjacent the bottom of such movable iron core 32 are connected by the equalization passageway 34 inside the movable valve seat 31 and the movable iron core 32. In this manner, the pressure equalization of the movable iron core 32 is obtained.

Furthermore, as can best be seen in FIG. 2, the tip end effective cross-sectional area A1 of the movable valve seat 31 is almost the same as the opening cross-sectional area B1 of the first chamber 21. The third chamber 23 and the equalization chamber 20 are connected and the effective cross-section A2 of the fixed valve seat 24 is preferably about the same size as the opening cross-section B2 of the equalization chamber 20 so that a consistently stabilized pressure equalization can also be obtained in this switching valve area.

As described above, the electromagnetic valve of the present invention provides the three-position control, i.e., the first position, the overlapped position and the second position, which can be accomplished in an easy and economical manner by determining the excitation current of the solenoid to be one of the first, the second and the third set points. Such control is of considerable value in the operation of a slip prevention system of a railway car. In addition, a number of other specific effects can be accomplished with the electromagnetic valve of the present invention.

By operation of the electromagnetic valve in the following manner, it is possible to obtain the three-position control to now be described in detail. First, when the solenoid excitation current is small (including a degaussing current) the suction force produced in the movable iron core is less than the added force of the first spring, and even if the movable iron core should move its tip end will not seat on the tip end surface of the movable valve and the tip end surface of the movable valve is attached to the fixed valve seat by the added force of the second spring. Therefore, the first chamber and the third chamber are connected via the connecting passage inside the movable valve. At the same time, the second chamber is blocked. In other words, the first port and the third port connect with each other and the second port is blocked. This condition represents the first position.

Next, when the solenoid excitation current becomes large and the suction force of the movable iron core achieves the added force of the first spring, the front end of the movable valve, and the first chamber and the third chamber are blocked, and from this time the added force of the second spring begins to act to resist the above-mentioned suction force, so that even if the above-mentioned excitation current becomes a little larger, its suction force does not exceed the total added force of the first spring and the second spring, and the state in which the movable valve, to which the movable valve seat is attached, is seated on the fixed valve seat, is maintained. Therefore, the first chamber, the second chamber and the third chamber are blocked from each other. In other words, each of the three ports is blocked and this is the overlap position.

When the solenoid excitation current increases further and the suction force of the movable iron core becomes larger than the total added force of the springs, the movable valve on which the movable valve seat is still seated, separates from the fixed valve seat. Therefore, the second chamber connects to the third chamber while the first chamber is blocked. In other words, the second port and the third port are connected, and the first port is blocked and this is the second position.

In this manner, the problem described above can be solved by selecting any values in each area of the above-described three situations in relation to the suction force and the added force of the spring, and by determining these as the first, second and third set points, enabling the achievement of the above-mentioned first position, second position and overlap position is possible by selecting these set points.

It can be seen that the objects of the present invention are achieved by the provision of an electromagnetic valve having the ability to select from three modes. These modes are the release, overlap and brake, which are the readhesion control functions of a railway car brake system. Such electromagnetic valve being a three-port, three-position valve, and at the same time having a single solenoid for the excitation current control.

While a presently preferred embodiment of the present invention has been described in detail above, it should be understood by those persons skilled in the electromagnetic valve art that other modifications and adaptations of the present invention can be made without departing from the spirit and scope of the attached claims.

We claim:

1. An electromagnetic valve for use in a wheel slip prevention system of a railway car air brake system, said electromagnetic valve comprising:
   (a) a valve body portion having an inner cavity therein and at least three fluid communication ports communicating with said inner cavity from an outer surface of said valve body;
   (b) a first intermediate member positioned within said cavity, said first intermediate member having a stepped generally hollow portion along a longitudinal axis thereof, said first intermediate member having a first aperture aligned for fluid communication with a third port of said valve body and a second aperture aligned for fluid communication with a second port of said valve body;
   (c) a fixed valve seat secured to said first intermediate members adjacent one end thereof;
   (d) a second intermediate member positioned within a portion of said hollow portion of said first intermediate member, said second intermediate member having a stepped generally hollow portion along a longitudinal axis thereof, said second intermediate member having an aperture through a side wall thereof connected for fluid communication with said third port;
   (e) a movable valve member positioned within said stepped generally hollow portion of each of said first and said second intermediate members, said movable valve member having a generally hollow portion along a longitudinal axis thereof, said generally hollow portion being in fluid communication with a first port of said valve body,
   (f) a sealing member carried by said movable valve adjacent one end thereof for sealing engagement with said fixed valve seat;
   (g) a solenoid means including a generally hollow fixed iron core member and a movable iron core member positioned above said valve body portion; and
   (h) a movable valve seat positioned within said fixed iron core for engaging said sealing member.

2. An electromagnetic valve, according to claim 1, wherein said electromagnetic valve further includes means for sealing an outer surface of said first intermediate member with said inner cavity of said body portion.

3. An electromagnetic valve, according to claim 2, wherein said electromagnetic valve further includes a means for sealing an outer surface of said second intermediate member with an inner surface of said second intermediate member.

4. An electromagnetic valve, according to claim 3, wherein said electromagnetic valve further includes a means for sealing an outer surface of said movable valve with an inner surface of said second intermediate member.

5. An electromagnetic valve, according to claim 1, wherin a first chamber, a second chamber, a third chamber and an equalization chamber are formed within said valve body by said first intermediate member, said second intermediate member and said movable valve.

6. An electromagnetic valve, according to claim 5, wherein said first chamber, said second chamber, said third chamber and said equalization chamber form concentric circles.

* * * * *